Oct. 15, 1963 W. P. LANGENBERG ETAL 3,106,857
MACHINING AND TRACING APPARATUS
Filed May 27, 1960 2 Sheets-Sheet 1

INVENTORS.
WALTER P. LANGENBERG
RALPH SIEBERT
BY
*George C. Sullivan*
Agent

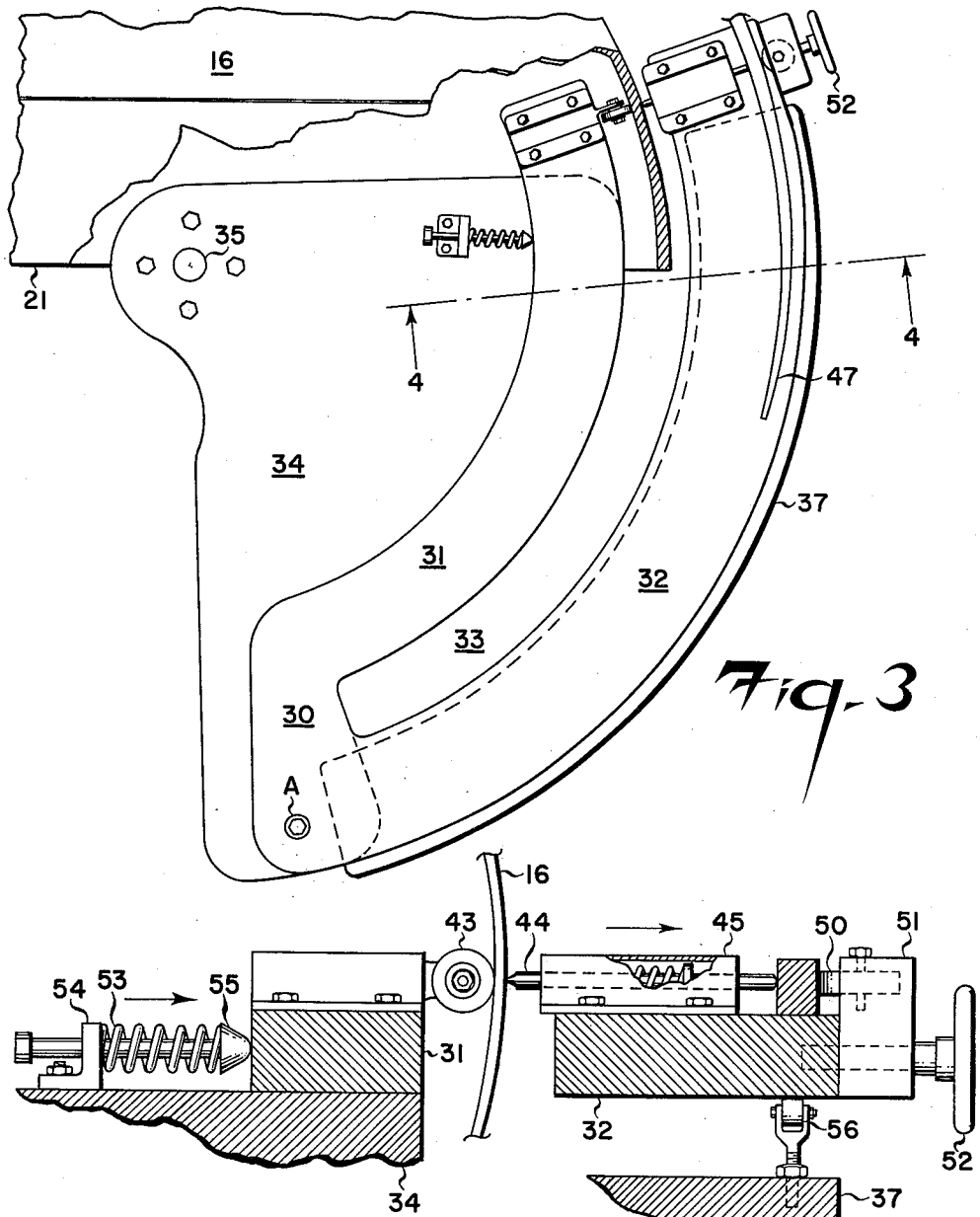

3,106,857
MACHINING AND TRACING APPARATUS
Walter P. Langenberg, North Hollywood, and Ralph Siebert, La Canada, Calif., assignors to Lockheed Aircraft Corporation, Burbank, Calif.
Filed May 27, 1960, Ser. No. 32,258
1 Claim. (Cl. 82—14)

The present invention relates to the art of forming compound surfaces and more particularly to apparatus for machining and tracing compound curves.

It has been a difficult problem in the machining industry to machine large hemispheric workpieces with varying wall thicknesses including tapers or transitions. Generally, where the diameter of the base of the hemisphere measures 60" across, the workpiece is formed with material thickness transitions spun into the inside of the hemispheric shell. In order to provide for a material thickness reduction to give a required plus or minus .003 inch metal thickness, chemical milling processes are usually employed.

However, difficulties are encountered when employing a chemical milling process to finish the hemispheric shell since variations in the final spun part necessitates detailed preinspection of material thickness and extensive masking to compensate for thicknesses in transitions and inconsistencies. This process represents great expenditure of time and funds to achieve.

The device of the present invention obviates the above difficulties by providing a machining apparatus which senses the inside diameter of the hemispheric shell and in cooperation with a semicircular cam, causes a cutter to mate with the outside diameter of the sphere and cut the outer surface of the sphere to a desired thickness. A roller senses and traces the inside wall of the shell and through a common fork member positions the cutter properly for machining. The cam determines the depth of the machining cut and serves to urge the cutter into engagement with the outer surface of the shell.

Therefore, it is an object of the present invention to provide an improved machining apparatus having a specially great range of capacity for forming curved surfaces and more particularly for forming spherical surfaces, compound curved surfaces having curvatures consisting of true arcs and for forming surfaces of irregular curves.

Another object of the present invention is to provide a machining and tracer apparatus of simple, substantial and practical construction to facilitate the ready and accurate forming of curved surfaces by simple adjustment of cooperative elements of the machine up to their maximum range of adjustment, and to provide for the attachment and resetting and reorganization of the principal elements of the machine so as to utilize cams.

Still a further object of the present invention is to provide a machining and tracing device which eliminates preinspection of material thickness and manual compensation for material thickness and inconsistencies and eccentric shaped parts inherent when a chemical milling process is employed.

Therefore, considering the general utility of the apparatus of the present invention in the various arts, it is to be understood that the word "workpiece," as hereinafter used, will be understood to refer to the object placed in the apparatus to be operated upon thereby and the production of the desired curved surface regardless of the character and the use to which the object itself may be intended.

Other objects of the invention and the various advantages and characteristics of the present machining and tracing apparatus will be apparent from a consideration of the following detailed description when taken in connection with the accompanying drawings in which like numbers of reference denote corresponding parts throughout the several views, in which:

FIGURE 3 is a plan view of the apparatus of FIGURE 1 taken in the direction of arrows 3—3; and FIGURE 4 is a sectional view of the apparatus of FIGURE 3 taken in the direction of arrows 4—4.

Figure 1:
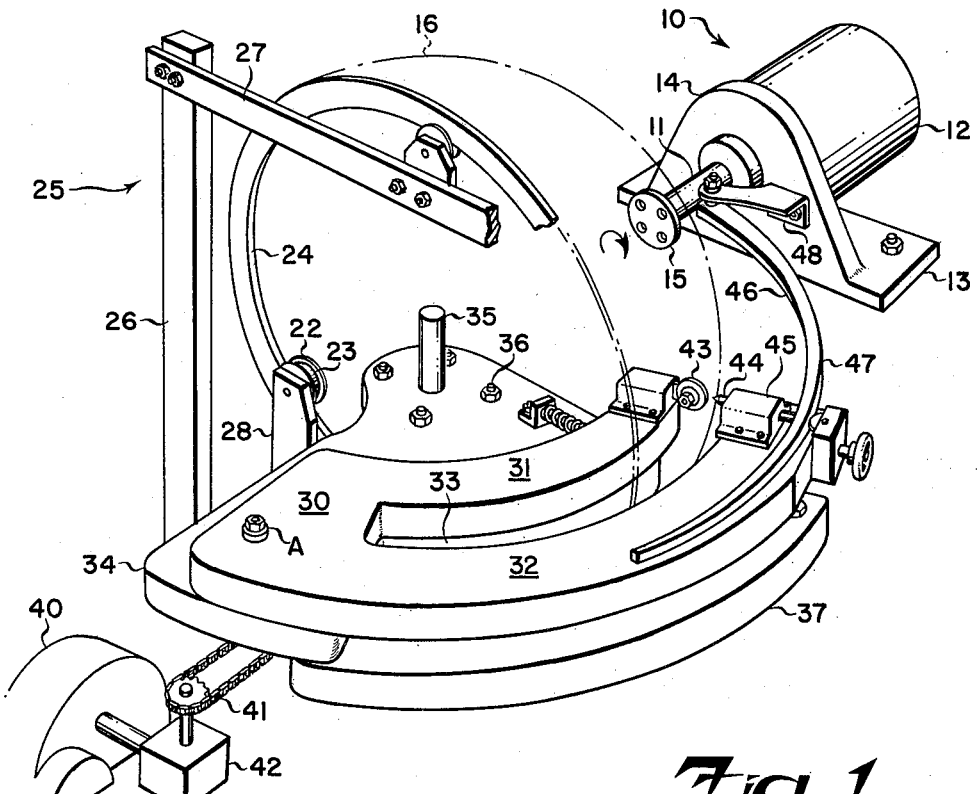
FIGURE 1 is a perspective view of the mechanical cam actuated machining tracer apparatus of the present invention.

With reference to the apparatus of FIGURE 1, turning equipment 10 is shown having a rotary shaft 11 projecting from a power unit 12. The power unit is mounted on a support 13 having an upright flange 14 through which the shaft 11 projects. On the end of shaft 11 there is provided a fixture 15 to which a workpiece 16 is mounted. The turning equipment 10 can take many forms, and may take the form of an adaptation of conventional horizontal milling machine equipment such that shaft 11 may be turned by the headstock of such a conventional milling machine.

Figure 2:
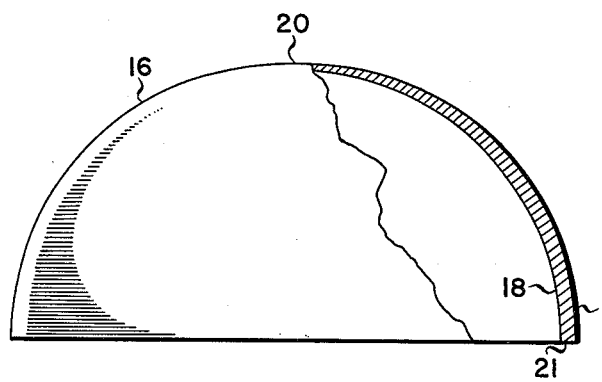
FIGURE 2 is a side view of a typical hemispheric workpiece shown partially in section formed by the apparatus of FIGURE 1.

Workpiece 16 as shown in FIGURE 2 is in the form of a hemisphere having an outside surface 17 and inside surface 18. It is noted that in one configuration, the workpiece wall thickness tapers from the apex 20 of the hemisphere to its circular base 21. Although a simple taper is shown, it is to be understood that other complex forms, shapes or varying thicknesses can be provided through the use of the subject invention. The apex of workpiece 20 is mounted on the fixture 15 by any suitable manner such as bolts and nuts or even high strength adhesives may be employed.

The base end 21 of the workpiece is suitably supported in vertically disposed rollers, such as roller 22, having a circumferential recess 23 for receiving the edge of a circular member 24 attached to the base 21 of the workpiece. Any suitable means for attachment may be employed so that the base end of the workpiece is accurately supported on the rollers. The rollers are held in position by a frame 25 having an upright member 26 and a pair of roller supporting arms 27 and 28.

The open end of the workpiece is straddled by a pivoted fork member 30 having arm 31 projecting into the interior of the workpiece and arm 32 held in fixed spaced relationship with respect to arm 31 arranged on the outside of the workpiece. Arms 31 and 32 define an open channel 33 through which the workpiece rotates. The fork member is pivotally mounted on a turntable 34 having its center co-ordinated with the center of the workpiece. The turntable is fixed to a shaft 35 by means of a mounting fixture (not shown) and bolt and nut arrangements, such as arrangement 36. Shaft 35 is rotatably supported on a base 37 which supports the shaft 35, the turntable 34 and the fork member 30. Shaft 35 is suitably connected to a power motor 40 by means of a chain drive 41 and a gear box 42 so that the turntable can be driven at a desired speed so that the fork member may be driven towards the apex of the workpiece and reversed to be driven towards the base of the workpiece.

Secured on the extreme end of arm 31 there is provided a spring biased roller 43 which engages with the inside surface of the workpiece. Secured on the end of arm 32 directly opposite to roller 43 and in adjustable engagement with the outer surface of the workpiece, there is provided a cutter tool 44 mounted in a tool holder 45. The opposite end of the cutter tool in engagement with the outer surface of the workpiece projects beyond the tool holder and is provided with a cam surface engageable with a cam surface 46 formed on a cam 47. Cam 47 is configured to present the general configuration which the outer surface of the workpiece is to assume. In the present application, the cam 47 is configured in a semicircle since it is the outer surface of a spherical workpiece which is being formed or machined. One end of cam 47 is pivotally attached to an element 48 which is secured to flange 14 of support 13.

As more clearly shown in FIGURES 3 and 4, cam 47 is laterally supported and backed up by a roller 50 mounted in a holder 51 which is secured to arm 32 by means of screw means 52.

As shown in FIGURE 4, the roller 43 is spring biased into engagement with the inner wall of the workpiece 16 by means of a compression spring 53 acting against a fixed support 54 which urges a member 55 supported on support 54 into forcible engagement with arm 31 of the fork member. FIGURE 4 also shows that the cutter 44 is in alignment with roller 43. The forked member is not only supported on turntable 44, but arm 32 of the fork member is supported on a plurality of rollers 56 carried on base 37.

In the apparatus of the present invention, it can be seen that roller 43 will follow the inner wall of the hemispheric workpiece and will cause the fork member to pivot about its pivot point A on the turntable 34. This pivoting arrangement brings the cutting tool 44 into position for engaging and cutting the outer surface of the hemispheric workpiece. Cutter 44 is backed up and urged into cutting engagement with the material of the workpiece by means of cam 47 and roller 50 fixed in essence to the arm 32. The cutter is urged into taking deeper or shallower cuts in the workpiece surface in accordance with the contour of the cam surface 46. In the present instance, as shown in FIGURE 3, the cam increases in width as the cutter travels toward the apex of the workpiece which causes the cutter to progressively take deeper and deeper cuts.

Having described only typical forms of the invention we do not wish to be limited to the specific details herein set forth, but wish to reserve to ourselves any variations or modifications that may appear to those skilled in the art and fall within the scope of the following claim.

We claim:

A machine performing arcuate surfaces on a workpiece comprising: a headstock supporting said workpiece on one side thereof; arm mounted rollers supporting said workpiece on its side opposite to its said one side; a bifurcated arcuate arm having an inner portion and an outer portion; a roller mounted on the inner portion of said bifurcated arm; resilient means biasing said bifurcated arm to urge said roller against the inside of said workpiece; an arcuate cam supported on the outer portion of said bifurcated arm coplanar with the center axis of said roller and in fixed spaced relationship about the outside of said workpiece; a cutting tool mounted on said outer portion of said bifurcated arm disposed between said cam and the outside of said workpiece; means for rotatably mounting said bifurcated arm so as to cause said roller and said tool to transverse an arcuate path; and a cam follower connected to said tool so that said tool and said follower move longitudinally along the common axis of said tool and said follower under the influence of said arcuate cam to urge said tool into cutting relationship with the outside of said workpiece.

References Cited in the file of this patent

UNITED STATES PATENTS

| | | |
|---|---|---|
| 2,686,444 | Reichl | Aug. 17, 1954 |
| 2,725,776 | Hopkins | Dec. 6, 1955 |
| 2,748,664 | Colombo | June 5, 1956 |
| 2,782,669 | Brandenberger | Feb. 26, 1957 |